United States Patent
Arnold et al.

(10) Patent No.: US 8,607,208 B1
(45) Date of Patent: Dec. 10, 2013

(54) SYSTEM AND METHODS FOR OBJECT CODE HOT UPDATES

(75) Inventors: Jeffrey Brian Arnold, Cambridge, MA (US); Timothy Good Abbott, Cambridge, MA (US); Anders Kaseorg, Cambridge, MA (US)

(73) Assignee: Oracle International Corporation, Redwood Shores, CA (US)

( * ) Notice: Subject to any disclaimer, the term of this patent is extended or adjusted under 35 U.S.C. 154(b) by 468 days.

(21) Appl. No.: 12/940,393

(22) Filed: Nov. 5, 2010

Related U.S. Application Data

(63) Continuation-in-part of application No. 12/243,954, filed on Oct. 1, 2008, now Pat. No. 8,261,247.

(60) Provisional application No. 61/258,930, filed on Nov. 6, 2009.

(51) Int. Cl.
- *G06F 9/44* (2006.01)
- *G06F 9/45* (2006.01)
- *G06F 9/445* (2006.01)
- *G06F 3/00* (2006.01)
- *G06F 13/00* (2006.01)
- *G06F 9/46* (2006.01)

(52) U.S. Cl.
USPC ........... 717/153; 717/129; 717/140; 717/162; 717/168; 717/170; 717/173; 717/176; 719/321

(58) Field of Classification Search
None
See application file for complete search history.

(56) References Cited

U.S. PATENT DOCUMENTS

| | | | |
|---|---|---|---|
| 6,691,308 B1 * | 2/2004 | Kasper | 717/168 |
| 6,928,536 B2 | 8/2005 | Duesterwald et al. | |
| 7,444,630 B2 * | 10/2008 | Kasper | 717/170 |
| 7,779,401 B2 | 8/2010 | Scian et al. | |
| 8,261,247 B2 * | 9/2012 | Arnold | 717/140 |
| 8,266,597 B2 * | 9/2012 | Panchamukhi et al. | 717/129 |
| 8,468,516 B1 * | 6/2013 | Chen et al. | 717/170 |
| 2004/0088679 A1 | 5/2004 | Grala | |
| 2004/0107416 A1 | 6/2004 | Buban et al. | |
| 2004/0158827 A1 * | 8/2004 | Kasper | 717/162 |
| 2005/0027846 A1 * | 2/2005 | Wolfe et al. | 717/176 |
| 2007/0214461 A1 * | 9/2007 | Glatron et al. | 719/321 |
| 2009/0293051 A1 * | 11/2009 | Krywaniuk | 717/173 |
| 2010/0269105 A1 * | 10/2010 | Arnold | 717/153 |
| 2010/0269106 A1 * | 10/2010 | Arnold | 717/168 |

OTHER PUBLICATIONS

Michael Jang, Linux Patch Management, 2006, [Retrieved on Jul. 30, 2013]. Retrieved from the internet: <URL: http://ptgmedial.pearsoncmg.com/images/9780132366755/downloads/0132366754_Jang_book.pdf> 288 Pages (1-262).*

Theo Forbath, The Total Cost of Security Patch Management,2005, [Retrieved on Jul. 30, 2013]. Retrieved from the internet: <URL: http://www.google.com/url?sa=t&rct=j&q=&esrc=s&frm=1&source=web&cd=15&ved=OCKsBEBYwDg&url=http%3A%2F%2Fdownload.microsoft.com%2Fdownload%2F1%2F7%2Fb%2F17b54do6-1550-4011-9253> 88 Pages (1-24).*

(Continued)

*Primary Examiner* — Don Wong
*Assistant Examiner* — Anibal Rivera
(74) *Attorney, Agent, or Firm* — Osha Liang LLP

(57) ABSTRACT

An object code hot update system generates hot updates for patching running programs by analyzing upstream post-patch code, augmenting the upstream post-patch code to provide augmented post-patch code with additional initialization functionality. The system further provides techniques to identify a candidate extra-change site in upstream post-patch code and modify the upstream post-patch code to generate a hot update.

18 Claims, 13 Drawing Sheets

(56) References Cited

OTHER PUBLICATIONS

Altekar, G. et al., "OPUS: Online Patches and Updates for Security," Proceedings of the 14th USENIX Security Symposium, Jul. 2005, USENIX Assoc., Berkeley, CA (16 pages).

Baumann, A. et al., "Reboots are for Hardware: Challenges and Solutions to Updating an Operating System on the Fly," Jun. 2007, USENIX Assoc., Berkeley, CA (14 pages).

Baumann, A. et al., "Providing Dynamic Update in an Operating System," Proceedings of the USENIX Annual Technical Conference, Apr. 2005, USENIX Assoc., Berkeley, CA (13 pages).

Buck, B. et al., "An API for Runtime Code Patching," Journal of High-Performance Computing Applications, Nov. 2000, 14(4), Sage Publications, Inc., Thousand Oaks, CA (12 pages).

Chen, H. et al., "Live Updating Operating Systems Using Virtualization," Proceedings of the 2nd ACM Conference on Virtual Execution Environments, Jun. 2006, ACM, New York, NY (10 pages).

Makris, K. et al., "Dynamic and Adaptive Updates of Non-Quiescent Subsystems in Commodity Operating System Kernels," Proceedings of the 2nd ACM Eurosys. Conference, Mar. 2007, ACM, New York, NY (14 pages).

Neamtiu, I. et al., "Practical Dynamic Software Updating for C," Proceedings of the 2006 ACM Conference on Programming Language Design and Implementation (PLDI), Jun. 2006, ACM, New York, NY (12 pages).

Tamches, A. et al., "Fine-Grained Dynamic Instrumentation of Commodity Operating System Kernels," Proceedings of the 3rd OSDI Symposium, Feb. 1999, USENIX Assoc., Berkeley, CA (15 pages).

\* cited by examiner

450

332
CONFIGURE THE HOT UPDATE

460
PLACE IN A DATA STRUCTURE IN THE HOT UPDATE A POINTER CORRESPONDING TO A FUNCTION PROVIDING INITIALIZATION FUNCTIONALITY

320
AUGMENT THE UPSTREAM POST-PATCH CODE TO PROVIDE ADDITIONAL INITIALIZATION FUNCTIONALITY

470
ADDITIONAL INITIALIZATION FUNCTIONALITY INCLUDES PROVIDING INITIALIZATION FUNCTIONALITY AS IF THE COMPUTER PROGRAM WAS REBUILT FROM UPSTREAM POST-PATCH CODE AND RESTARTED

480
ADDITIONAL INITIALIZATION FUNCTIONALITY INCLUDES FUNCTIONALITY TO CREATE A SHADOW DATA STRUCTURE IN THE TARGET SYSTEM MEMORY

482
ADDITIONAL INITIALIZATION FUNCTIONALITY FURTHER INCLUDES FUNCTIONALITY TO INITIALIZE THE SHADOW DATA STRUCTURE

FIG. 11

SYSTEM AND METHODS FOR OBJECT CODE HOT UPDATES

CROSS REFERENCE TO RELATED APPLICATIONS

This application is a continuation-in-part of earlier filed U.S. patent application Ser. No. 12/243,954, filed Oct. 1, 2008, now U.S. Pat. No. 8,261,247 entitled "METHOD OF MODIFYING CODE OF A RUNNING COMPUTER PROGRAM BASED ON SYMBOL VALUES DISCOVERED FROM COMPARISON OF RUNNING CODE TO CORRESPONDING OBJECT CODE," and is related to U.S. patent application Ser. No. 12/427,724, filed Apr. 21, 2009, entitled "METHOD OF DETERMINING WHICH COMPUTER PROGRAM FUNCTIONS ARE CHANGED BY AN ARBITRARY SOURCE CODE MODIFICATION," and U.S. patent application Ser. No. 12/427,732, filed Apr. 21, 2009, entitled "METHOD OF FINDING A SAFE TIME TO MODIFY CODE OF A RUNNING COMPUTER PROGRAM."

This application claims the benefit of the filing date of earlier filed U.S. Provisional Patent Application having Ser. No. 61/258,930 entitled "SOURCE AND OBJECT CODE FOR AN OBJECT CODE HOT UPDATE SYSTEM", filed Nov. 6, 2009, that shares co-inventorship with the present application. The entire teachings and contents of these Patent Applications are hereby incorporated by reference herein in their entirety.

BACKGROUND OF THE INVENTION

When software developers correct a problem in the source code of a computer program (such as an operating system kernel or an application program), they typically create and distribute a patch, which includes a set of changes to the source code. Software vendors or system administrators apply the patch to their copy of the source code, build a new binary copy of the computer program, and then distribute that new binary program to servers and end-user machines. The computer program must then be restarted in order to benefit from the update. Restarting programs in order to update them can cause undesirable disruption.

A "hot update" changes a running program (also referred to as computer program) without restarting it. However, there are several challenges relating to the use of conventional patches as the bases for hot updates.

BRIEF SUMMARY OF THE INVENTION

Conventional hot update systems are limited as to the types of patches which can be applied to a running application or operating system. Some of these challenges faced by conventional systems relate to the initialization of data structures and unnecessary identification of functions to be updated. Other challenges are presented when traditional updates add or change code that relies on additional data structures which the pre-patch code does not create. Still other challenges are presented because it is unsafe to modify or replace a function that is in the process of being executed by any program thread. Consequently it may be difficult to apply an update that modifies many functions or heavily-used functions. Yet another challenge occurs when a patch requires additional information from analysis of the upstream patch in order to produce a working object code hot update so that a data structure in the program which never changes at runtime and can be safely replaced with a modified version from post-patch object code.

Embodiments of the invention include techniques for preparing hot updates with an object code hot update system to address the challenges described above. The object code hot update system is one method for preparing a hot update. In the object code hot update system, the hot update is produced by analyzing the object code related to the unmodified program ("pre-patch object code" also referred to as pre-patch object code) and object code related to the modified program ("post-patch object code" also referred to as post-patch object code), for example by identifying differences between them. In some embodiments of an object code hot update system, the pre-patch object code is obtained by compiling source code related to the unmodified program ("pre-patch source code") and the post-patch object code is obtained by compiling source code related to the modified program ("post-patch source code"). For example, the pre-patch source code may be the original source code of the program and the post-patch source code may be obtained by applying a source code patch to the pre-patch source code.

Embodiments of the present invention include analyzing, modifying, augmenting, and performing other steps upon source or object or other code. Many of these may be performed on source code, or object code, or any other form of code that source code is transformed into or from which an executable program or program component is produced. The term "code," as used herein, includes but is not limited to "pre-patch code" including pre-patch source code, or pre-patch object code, or any other form of code that corresponds to pre-patch object code because pre-patch source code is transformed into it or because from it is produced pre-patch object code or any program or program component derived from pre-patch object code. The term "program component", as used herein, includes a module, a library, the program as a whole, or any other unit which may be initialized or incorporated into the program at a distinct time. The term "software module" is also used herein with the same meaning.

Because embodiments of the present invention include techniques for modifying or augmenting post-patch code or pre-patch code to be processed by the object code hot update system, it is convenient to refer separately to the code as it may exist without the application of these techniques and to the code as so modified or augmented. As used herein, the term "upstream" generally refers to the code as it may exist without the application of these techniques. The term is used for clarity in discussing the application of these techniques, and does not imply any limitation on how the upstream code is itself produced, or by whom, or how it is obtained for the application of these techniques; for example, it is not necessary that whatever efforts may produce the upstream code be performed by different people from those who apply these techniques or at a distinctly separate time from when these techniques are applied.

Similarly, as used herein, the terms "modify", "augment", and their grammatical variations are used for ease of comprehension, and these terms are intended to include cases where existing lines, functions, sections, or other elements of code are removed, altered, or replaced, or new lines, functions, sections, or other elements of code are added, or any combination thereof, either in the same or separate functions, files, directories, or any other subdivisions of code.

Embodiments of the present invention include techniques for preparing object code hot updates that can be used to address multiple challenges related to the complexity and safety of the hot updates. For example, an incorrectly executed hot update can cause an operating system to become unstable or "crash." In certain embodiments, a traditional source code patch is modified in order to overcome these challenges in the resulting object code hot update.

Embodiments of the invention as disclosed herein provide mechanisms and techniques for supplying code to be run when an object code hot update system update is applied to update data structures in memory to: i) emulate the effects of: a change to the initialization resources of a program component and a change to data structure initialization code; and ii) perform initialization tasks for new data structures to be used by the updated code.

Using techniques disclosed herein, it is possible to incorporate an upstream patch source code for a program with corresponding initialization source code to provide a full patch source code, compile the full patch source code into object code including initialization object code forming an object code hot update, and execute the initialization object code in the process of applying the object code hot update to a program; wherein the initialization object code provides initialization functionality as if the program was patched with the patch source code, recompiled and restarted.

Other techniques disclosed herein modify a source code patch before feeding it to an object code hot update system, in order to improve the safety, ease of application, or other qualities of the resulting object code hot update. In some configurations the patch is modified to avoid some or all changes in line numbers by adding or removing line breaks in the post-patch source code or by inserting line-number directives. In other configurations, the upstream source code patch modifies header files and the patch is modified to avoid changes in some compilation units, or changes that survive a preprocessing stage.

In some embodiments, additional information for the object code hot update is provided in the form of additional source code added to the source code patch and the additional information, in whole or in part, comprises source code for actions that should be executed when the object code hot update is applied or undone or the additional information, in whole or in part, describes an assumption that may be safely made about a data structure, function, or other element of the program and the assumption described is that a data structure or elements within a data structure will not have changed during the running of the program or the assumption described is that the binary code of a function may safely be patched in place, or that one or more of the criteria for such an in-place patching to be safe are met.

One exemplary technique includes analyzing upstream post-patch code for a computer program to determine whether additional initialization functionality is required for a hot update and augmenting the upstream post-patch code to provide augmented post-patch code, the augmented post-patch code having additional initialization functionality. The technique further includes processing the augmented post-patch code with an object code hot update system to generate the hot update and configuring the hot update to provide the additional initialization functionality to a target system having a memory for data and executable code. Such a technique solves several challenges related to initialization functionality in the hot update.

Another exemplary technique includes identifying a candidate extra-change site in upstream post-patch code for a computer program, modifying the upstream post-patch code to provide modified post-patch code, including modifying the candidate extra-change site and processing the modified post-patch code to generate a hot update. This technique solves challenges related to problems related to including unnecessary functions in the object code hot update.

Another embodiment includes the technique of applying patch code to pre-patch object code of a program to produce post-patch object code of the program, identifying unnecessary modifications to the program that are based on the post-patch object patch code, and applying patch optimization processing by at least one of i) modifying the source code of the program, ii) modifying the source code of the patch, and iii) rewriting portions of the patch in assembly language, the patch optimization processing producing patch-optimized source code that minimizes unnecessary modifications to the program that are modified by the patch. The technique further includes utilizing the patch optimized processed source code to produce patch-optimized post-patch object code of the program that that minimizes an amount of unnecessary modifications to the program that are modified by the patch.

Embodiments of the invention include any type of computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. It is to be understood that the system of the invention can be embodied strictly as a software program, as software and hardware, or as hardware alone such as within a processor, or within an operating system or within a software application.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles and concepts.

FIGS. 9-13 are flow charts of processing steps performed to generate a hot update in accordance with embodiments disclosed herein.

DETAILED DESCRIPTION

Embodiments of the invention include techniques for preparing hot updates that can be used to address multiple challenges presented when applying hot updates to software modules (e.g., applications and operating systems) without restarting or rebooting. In certain techniques, described below, object code input to the hot update system includes code that performs additional functions when the hot update is applied. Input to the hot update system includes upstream post-patch code. For example, the upstream post-patch code may include one or more of source code (upstream post-patch source code) and object code (upstream post-patch object code). The upstream post-patch code is modified and processed to generate a hot update. The hot update is configured to provide initialization functionality to meet challenges of applying hot updates.

Figure 1:
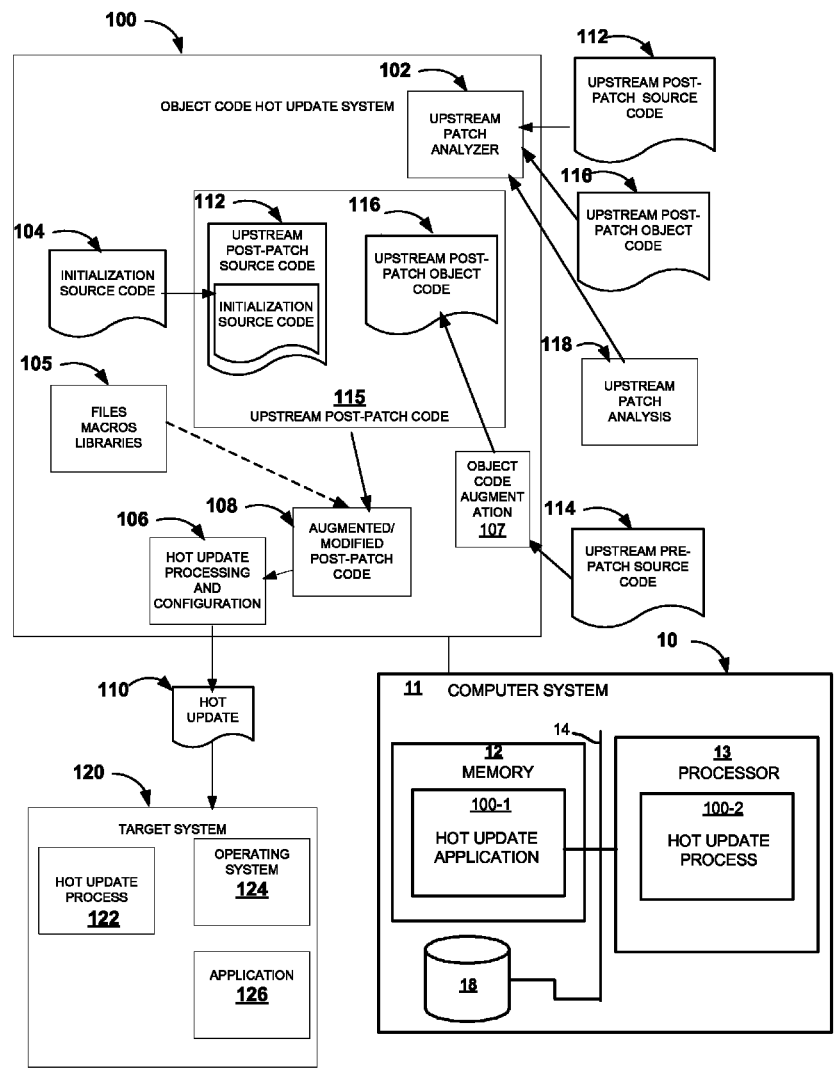
FIG. 1 is a schematic diagram illustrating the production and application of a hot update in accordance with one example embodiment disclosed herein.

FIG. 1 illustrates the computer environment 10 suitable for use in explaining example embodiments of invention. The computer-networking environment 10 includes computer system 11 that executes hot update system 100. The computer system 11 may be any type of computerized device such as a personal computer, laptop, workstation, mainframe terminal, or the like. In this example, computer system 11 generally includes in interconnection mechanism 14 such as a data bus, motherboard or other circuitry that interconnects a memory 12, a processor 13. The architecture of the computer system 11 is shown in FIG. 1 by way of example only. The memory 12 within each computer system 11 may be any type of computer readable medium such as random access memory (RAM), read only memory (ROM). The memory 12 may be fixed or removable from the computer system 11, such as a floppy disk, magnetic disk, optical disk media (e.g., CD ROM) or the like. In one embodiment, the memory 12 is encoded with computer program logic (e.g., software code) that includes the hot update system 100. The computer system 11 may also include file system 18.

The exemplary hot update system 100 includes an optional upstream patch analyzer 102, a hot update processing and configuration module 106. The inputs to the hot update system 100 include upstream post-patch source code patch 112 and upstream post-patch object code 116 (collectively referred to as upstream post-patch code 115). Other inputs include, but are not limited to, upstream pre-patch source code 114 and an upstream patch analysis 118. The upstream patch analysis 118 can be provided, for example, by a programmer or an automated system. The basic operation of hot update systems is described in "Ksplice: Automatic Rebootless Kernel Updates," (referred to herein as the Ksplice Paper) by Arnold and Kaashoek, published Nov. 7, 2008 on the Web at http://ksplice.com/paper; also published Apr. 1, 2009 in the proceedings of the EuroSys 2009 conference in Nuremberg, Germany, which is hereby incorporated by reference in its entirety. Further details of some hot update systems are described in the related applications listed above.

In operation, the hot update system 100 can use a variety of inputs to produce a hot update 110. The hot update 110 is applied to a target system 120 and executed as a hot update process 122 to patch a software module or program on the target system 120, for example, an application 126 or an operating system 124 including device drivers or network components. Portions of the analysis of the upstream post-patch code 115, modification of the upstream post-patch code 115, processing of the modified post-patch code 108 and configuration of the hot update 110 can be automated, be performed manually, or can be performed manually assisted by software tools, for example macros and other tools. In one embodiment, a programmer reviews one or more of the patch source code, the post-patch source code, and the pre-patch source code. The programmer may also look at one or more of post-patch object code and pre-patch object code. For source code, common tools include an editor, a difference (diff) tool, and a version-control system. For object code analysis, tools such as "objdump", which displays object code in textual form, and a diff tool may be used. In addition, a set of optional library functions described below in conjunction with the examples in the attached appendix may be used for modifying the upstream post-patch code 115.

Embodiments of the present invention include analyzing, modifying, augmenting, and performing other steps upon post-patch code or upon patch code. It is to be understood that for the purposes of analyzing, modifying, augmenting, and some other steps as they appear in embodiments of the present invention, patch code and post-patch code are generally equivalent. For example, analyzing upstream post-patch source code 112 as it appears in embodiments of the present invention is equivalent to analyzing upstream patch source code, because upstream post-patch source code may be generated by applying upstream patch source code to upstream pre-patch source code and conversely upstream patch source code may be generated by comparing upstream pre-patch source code with upstream post-patch source code, so that either includes the same information. Similarly, modifying or augmenting upstream post-patch source code to generate modified or augmented post-patch source code is equivalent to modifying or augmenting upstream patch source code to generate modified or augmented patch source code, because modified or augmented post-patch source code may be generated by applying modified or augmented patch source code to modified or augmented pre-patch source code and conversely modified or augmented patch source code may be generated by comparing modified or augmented pre-patch source code with modified or augmented post-patch source code, so that either may be used for the same purposes. Therefore, it is to be understood that when steps herein of analyzing, modifying, or augmenting are applied to any kind of post-patch code or patch code, the same steps applied to patch code or post-patch code, respectively, are equivalent and are intended to be included within the scope of the present invention.

Figure 2:
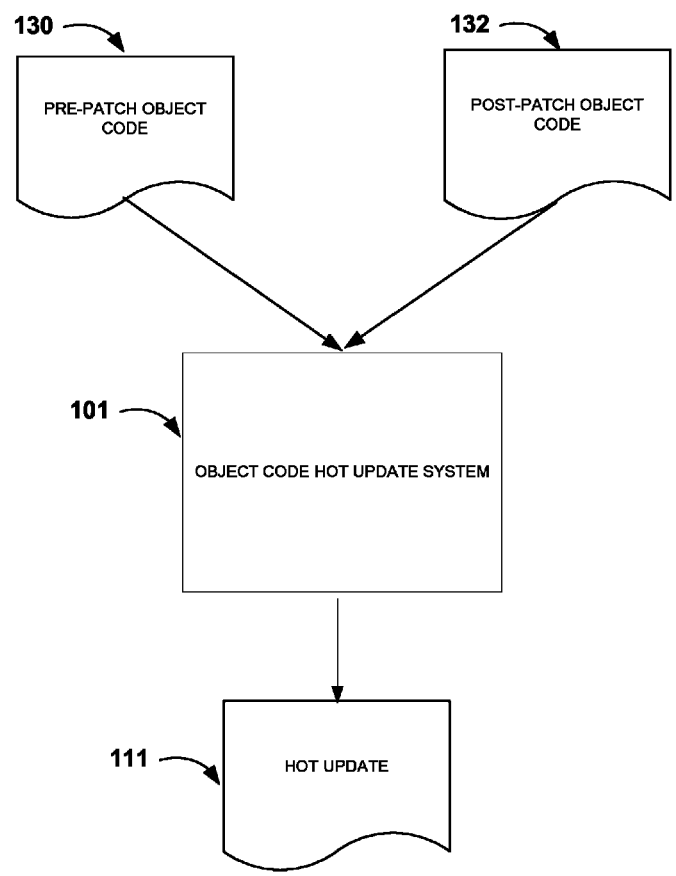
FIG. 2 is a schematic diagram illustrating the formation of a hot update from pre-patch object code and post-patch object code.
Figure 3:
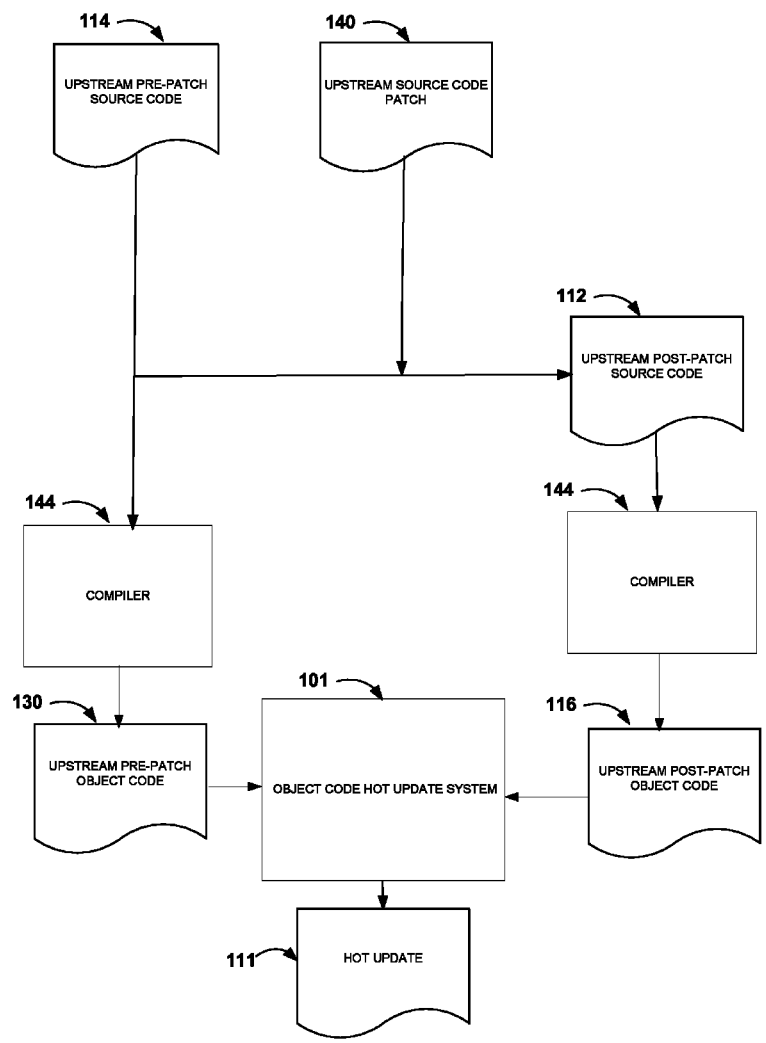
FIG. 3 is a schematic diagram illustrating the formation of a hot update from upstream pre-patch source code and a source code patch.

Now referring to FIG. 2 illustrates using object code to produce a hot update. As described in the Ksplice Paper and related applications, certain hot updates may be created by using pre-patch object code 130 and post-patch object code 132 supplied to object code hot update system 101 to produce a hot update 111. Another method to produce the hot update 111 is shown in FIG. 3, which illustrates using source code (e.g., pre-patch source code 114 and upstream source code patch 140) to produce the hot update 111. Generally, the system 101 of FIGS. 2 and 3 are not capable of dealing with the challenges described above and other challenges described below.

Figure 4:
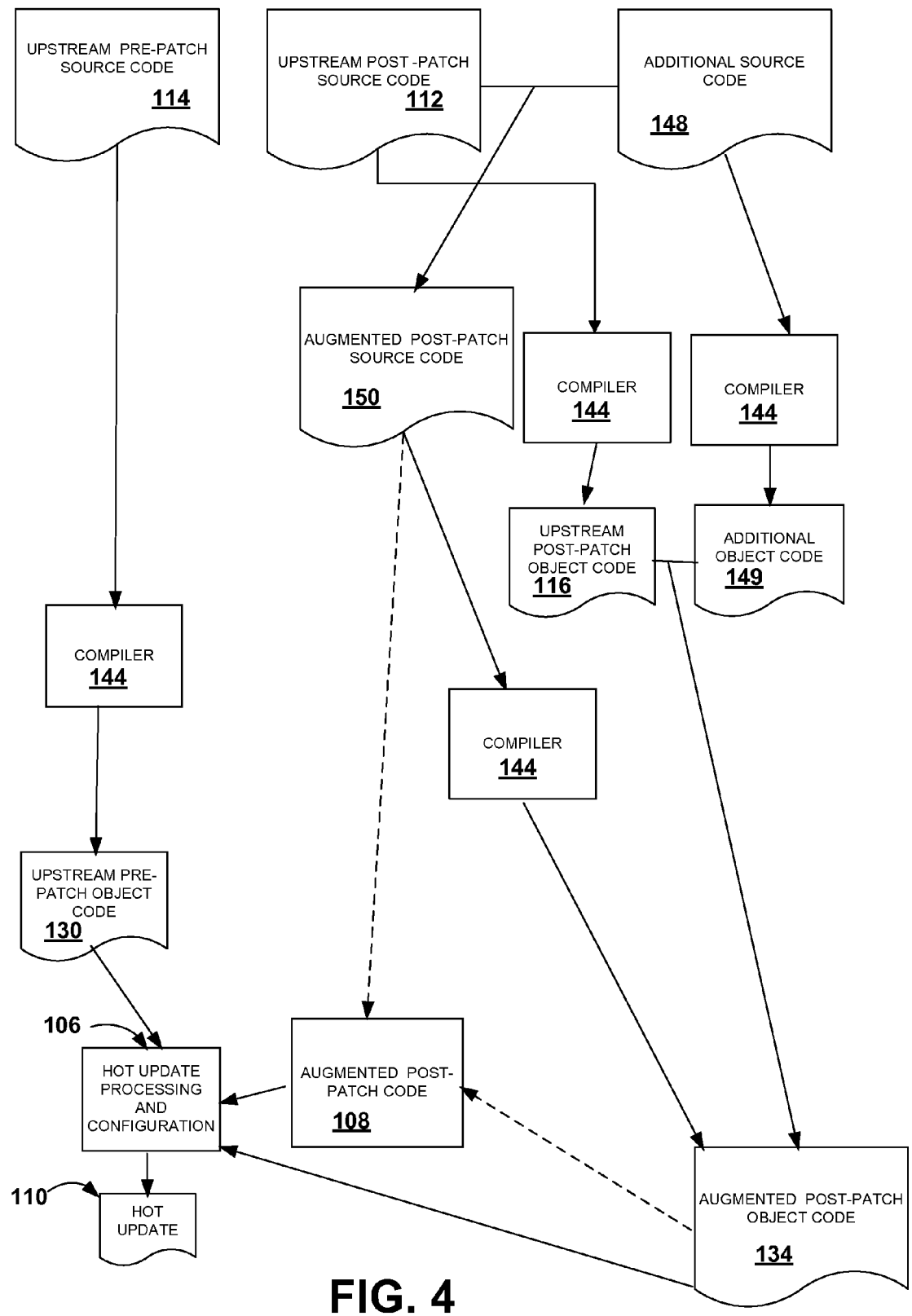
FIG. 4 is a schematic diagram illustrating the formation of a hot update from upstream pre-patch source code, an upstream source code patch, and additional source code using the system of FIG. 1.

Now referring to FIG. 4, several exemplary methods of modifying or augmenting upstream post-patch code 115 for a software module to provide modified post-patch code 108 are shown. Either upstream post-patch source code 112 or upstream post-patch object code 116 can be modified. In one exemplary method, the upstream post-patch source code 112 is combined with additional source code 148 to provide augmented post-patch source code 150, which is processed with a compiler 144 to provide augmented post-patch object code 134. In another exemplary method, additional source code 148 may be processed with a compiler 144 to produce additional object code 149, which is combined with upstream post-patch object code 116 to also provide augmented post-patch object code 134. The combination of upstream post-patch object code 116 and additional object code 149 may, for example, be effected with a linker, so that a single file in the combined object code includes both upstream post-patch object code 116 and additional object code 149, or, for example, by placing the respective object codes in separate files in a common directory tree, so that the combined object code comprises multiple files in the directory tree.

The dotted lines from augmented post-patch source code 150 to modified post-patch code 108 and augmented post-patch object code 134 to modified post-patch code 108 indicate that augmented post-patch code 108 includes augmented post-patch source code 150 as well as augmented post-patch object code 134.

Certain methods described below also require other changes to the object code input to the object code hot update system, which may for example be affected by changes to the upstream post-patch source code 112. In the code to be run when the hot update 110 is applied, it may be necessary to refer to functions, data structures, or other elements of the running program. In commonly used programming languages, such elements may be local to a compilation unit, module, or other program component in which they are used, so that the same name may refer to different elements in different components of the program. Consequently, if the new code is supplied in a separate file or compilation unit from the existing code, it may be impossible to refer without ambiguity to some elements of the running program. If the code to be run when the update is applied is supplied within a patch to the upstream pre-patch source code 114 or the upstream post-patch source code 112, it is possible to refer to any element of the program to which the upstream pre-patch source code 114 may refer.

By way of example, source code may be present in the source code of the traditional update, may be additional code inserted into the upstream post-patch source 112 code, or may be supplied to the object code hot update system in separate files. By way of example, the code may be identified to the object code hot update system as code to be run when the update is applied by the name of a function that includes the code, or by information in a special section in the object code, or by a specially chosen name for a file in which it is supplied. It is understood that there are additional methods known in the art for supplying the code to be included in the object code hot update 110 and of identifying that the code should be run when the update is applied. For example, the filename could be passed in a command-line option to the hot update system, or identified in a configuration file.

Figure 5A:
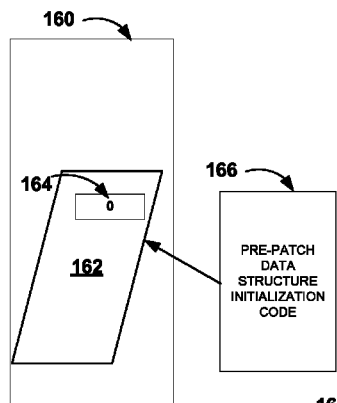
FIGS. 5A-5B are diagrams illustrating the application of initialization code in pre-patch code and post-patch code.
Figure 5B:
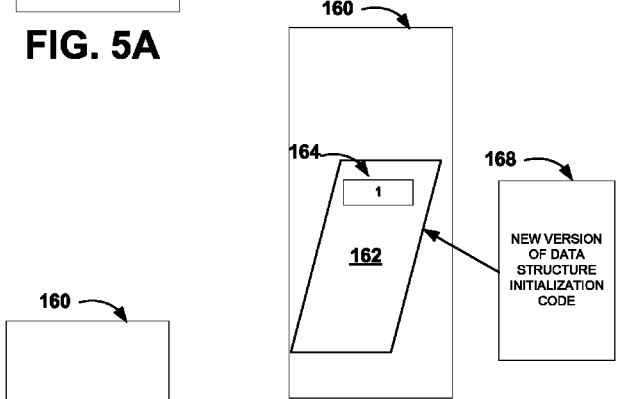

Now referring to FIG. 5A, the target system 120 includes memory 160 including a data structure 162 having a data element 164. When the program or a program component is initialized, or during the running of the program, pre-patch initialization resources or pre-patch data structure initialization code 166 will initialize the data element to a particular value, here, for example, to a zero value. If a patch is applied in a conventional manner, as shown in FIG. 5B, a new version of data structure initialization code 168 might initialize the value of data element 164 to a value of one to operate correctly with the corresponding new version of the program.

A first challenge occurs when a traditional update changes the initialization resources of the program or a program component. Consequently some data structures include different values or otherwise differ when the new version of the program is run as compared with when the old version of the program is run, as data structure 162 in FIG. 5B as compared to FIG. 5A. Initialization resources include code that is run during the initialization of the program component, and data or metadata associated with the program component that is read, copied, interpreted, or acted upon during the initialization of the program component. The initialization of the program component includes allocating memory for the program component, loading the program component into memory, initializing hardware associated with the program component, inserting information about the program component into data structures in the rest of the program or elsewhere in the system, setting up data structures associated with the program component, starting threads of execution associated with the program component, running code designated within the program component to be run at initialization, and other tasks performed at or upon the start of the program (for the whole program) or the incorporation of the program component into the running program (for other program components.)

A second challenge occurs when a traditional update changes data structure initialization code, i.e., code that performs initialization tasks for data structures. "Initialization tasks" include allocating memory for a data structure, filling in values, clearing previous values in memory, acquiring references to other data structures, and other tasks that are performed when a data structure is created. This second challenge also causes some data structures to differ when the post-patch version of the program is run as compared with the pre-patch version, as data structure 162 in FIG. 5B as compared to FIG. 5A.

As used herein, the term "initialization functionality" refers to functionality which is provided by initialization resources or by data structure initialization code, including any functionality of performing initialization tasks for data structures or of initializing a program component.

Figure 5C:
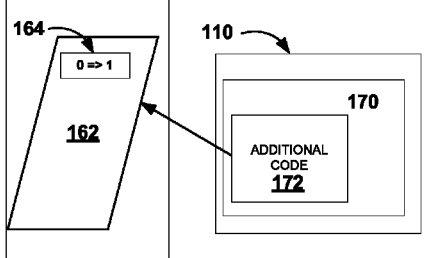
FIG. 5C is a diagram illustrating the execution of additional code in conjunction with the hot update in accordance with one example embodiment disclosed herein.

Now referring to FIG. 5C, when the hot update process 122 on the target system 120 is executed, the initialization functionality included in additional code 172 of a portion 170 of the hot update 110 will change the value of data element 164 from a zero to a one to reflect the correct value of data element 164 for operation with the hot-updated software module. The execution of additional code 172 included in hot update 110 updates the data structure element 164 to have the same value as if the data structure had been initialized by initialization resources or data structure initialization code, respectively, incorporated in the unmodified upstream post-patch code 115. The first and second challenges are addressed by executing additional code 172 (also referred to as initialization object code or additional object code), incorporated in the hot update 110, when the update is applied via hot update process 122. When the first challenge is to be addressed, the additional code 172 may emulate the effects of a change to the initialization resources of a program component. Further details are described below in the example under the heading of FIRST CHALLENGE. When the second challenge is to be addressed, the additional code 172 may emulate the effects of a change to data structure initialization code. Further details are described below in the example under the heading of SECOND CHALLENGE.

Figure 6A:
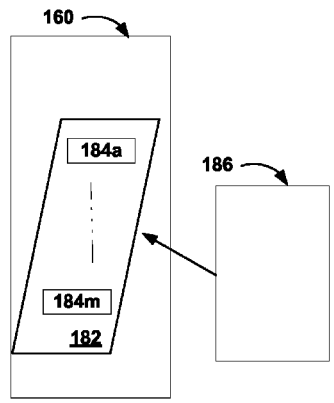
FIGS. 6A and 6B are diagrams illustrating the need to employ shadow data structures in accordance with an exemplary embodiment disclosed herein.
Figure 6B:
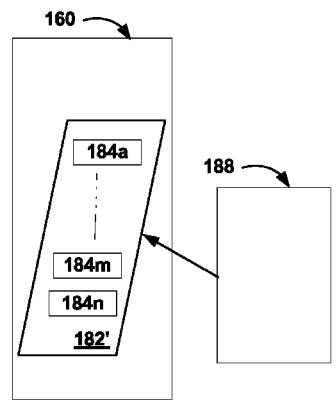
Figure 6C:
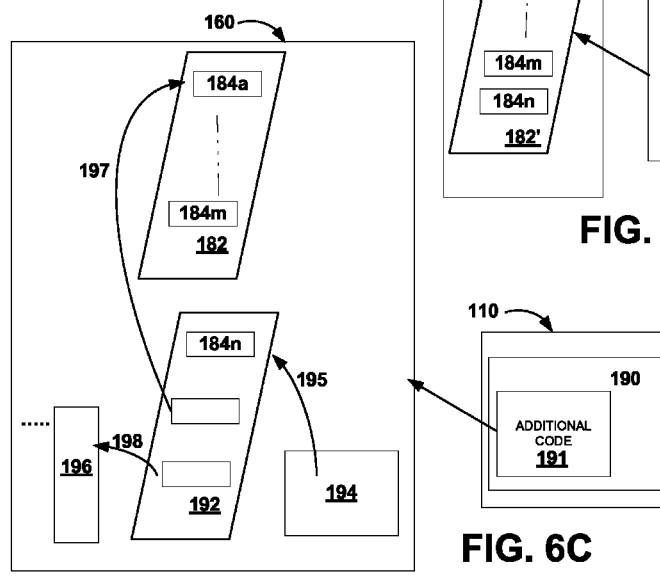
FIG. 6C is a diagram illustrating the operation of a shadow data structure in accordance with an exemplary embodiment disclosed herein.

For example, a change may add a new element to the definition of a data structure type, so that post-patch code performing initialization tasks for data structures of the type takes account of the new element; for example, it may allocate more memory than pre-patch code does for the same data structure type, and for example, it may initialize the additional element. Now referring to FIG. 6A, the target system 120 includes memory 160 including a data structure 182, as provided by pre-patch data structure initialization code, having data elements 184a to 184m. Now referring to FIG. 6B, if a traditional update were applied so that data structure 182 is initialized by post-patch data structure initialization code, then data structure 182' would have data elements 184a to 184n, including the additional data element 184n which does not have a counterpart in FIG. 6A. Now referring to FIG. 6C, when the hot update process 122 on the target system 120 is executed, the initialization functionality included in additional code 191 of a portion 190 of the hot update 110 will initialize a shadow data structure 192 corresponding to data structure 182. The shadow data structure 192 includes the additional data element 184n, and in the example embodiment depicted it also includes a reference to data structure 182 via pointer 197 and a reference to a successor data structure 196 in a linked list via pointer 198, and the shadow data structure 192 is included in a linked list with a list head 194 via pointer 195. In this embodiment, any site in the upstream post-patch code 115 which referred to additional data element 184n in data structure 182 is modified so that the site in the modified post-patch code identifies shadow data structure 192 by means of iterating the linked list from list head 194, and refers instead to element 184n as found in shadow data structure 192. In another example embodiment, the linked list, list head 194, and pointers 197 and 198 might be omitted in favor of a hash table, a binary tree, or another implementation of a map by which a site in the modified post-patch code may identify the shadow data structure 192 corresponding to data structure 182. Further details are described below, under the heading of SECOND CHALLENGE, in conjunction with the example labeled "CVE-2005-2709".

A third challenge occurs when a conventional update adds or changes code that relies on additional data structures which the pre-patch code does not create when executed. Further details are described below under the heading of THIRD CHALLENGE.

A fourth challenge is the situation where it may be unsafe to modify or replace a function that is in the process of being executed by any program thread. Consequently each object code change site may increase the difficulty of applying the hot update, so that it is desirable to reduce the number of object code change sites and to eliminate candidate extra-change sites. As used herein, the term "object code change site" refers to a site in object code where a pre-patch object code and a post-patch object code differ, and the term "source code change site" refers to a site in source code where a pre-patch source code and a post-patch source code differ. In particular, each difference identified by an object code hot update system is an object code change site. As used herein, the term "object code extra-change site" refers to an object code change site which it is not strictly necessary to incorporate in the hot update in order to serve the purpose of the update. For example, at an object code extra-change site, the pre-patch object code and the post-patch object code may accomplish substantially the same functionality but may differ in the hardware registers which are referred to, or in the ordering of instructions, or in a manner in which it interacts with another site in object code. If an object code extra-change site corresponds to a site in source code, the pre-patch source code and post-patch source code may differ at the site, or may not differ at the site.

As used herein, the term "candidate extra-change site" refers to either an object code extra-change site, or an object code change site which is identifiable as a possible object code extra-change site, or a site in code which is identifiable as possibly corresponding to or causing an object code extra-change site. For example, a source code change site which causes a difference in line numbers in a subsequent fragment of source code that does not differ between pre-patch source code and post-patch source code is a candidate extra-change site, when found in an environment in which differences in source code line numbers may cause differences in object code. For example, a source code change site which causes a difference in the set of identifiers that have been declared when an unmodified fragment of source code is compiled, or that otherwise changes the environment in which an unmodified fragment of source code is compiled, is a candidate extra-change site, when found in an environment in which such changes may cause differences in object code. For example, a candidate extra-change site may be identified after producing one or more of pre-patch object code and post-patch object code, or without producing any object code. For example, a candidate extra-change site may be definitely known or only suspected to correspond to or cause an object code change site, or if an object code change site is known in connection with the candidate extra-change site it may be definitely known or only suspected to be an object code extra-change site.

Figure 7:
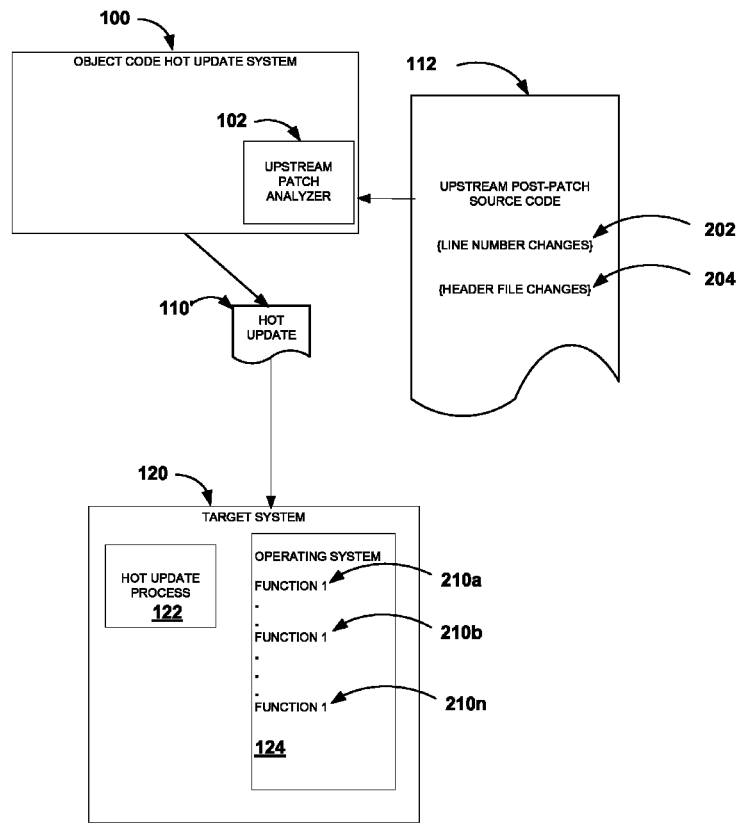
FIG. 7 is a diagram illustrating identifying a candidate extra-change site in upstream post-patch code in accordance with an exemplary embodiment disclosed herein.

Now referring to FIG. 7, the upstream patch analyzer 102 of the hot update system 100 identifies, in one embodiment, candidate extra-change sites 202 and 204 in upstream post-patch code 115 for a computer program. Candidate extra-change site 202 represents code changes, for example, changes to line numbers, which might result in a hot update 110' which would require updating a program function, here Function 1 210. Candidate extra-change site 204 represents the scenario where header file changes create an object code extra-change site in Function 1 210. In another embodiment, a programmer would identify candidate extra-change sites 202 and 204, for example by examining the upstream patch source code, identifying candidate extra-change site 202 as a change which alters the line numbers of subsequent code in a source file, and identifying candidate extra-change site 204 as a change which is located in a header file.

Function 1 210 may be a heavily-used function in a program 210a-210n. If it is determined that the update to Function 1 210 can be avoided, the upstream post-patch source code 112 is modified as described below in conjunction with FIG. 8 and also in the example below under the heading of FOURTH CHALLENGE.

Figure 8:
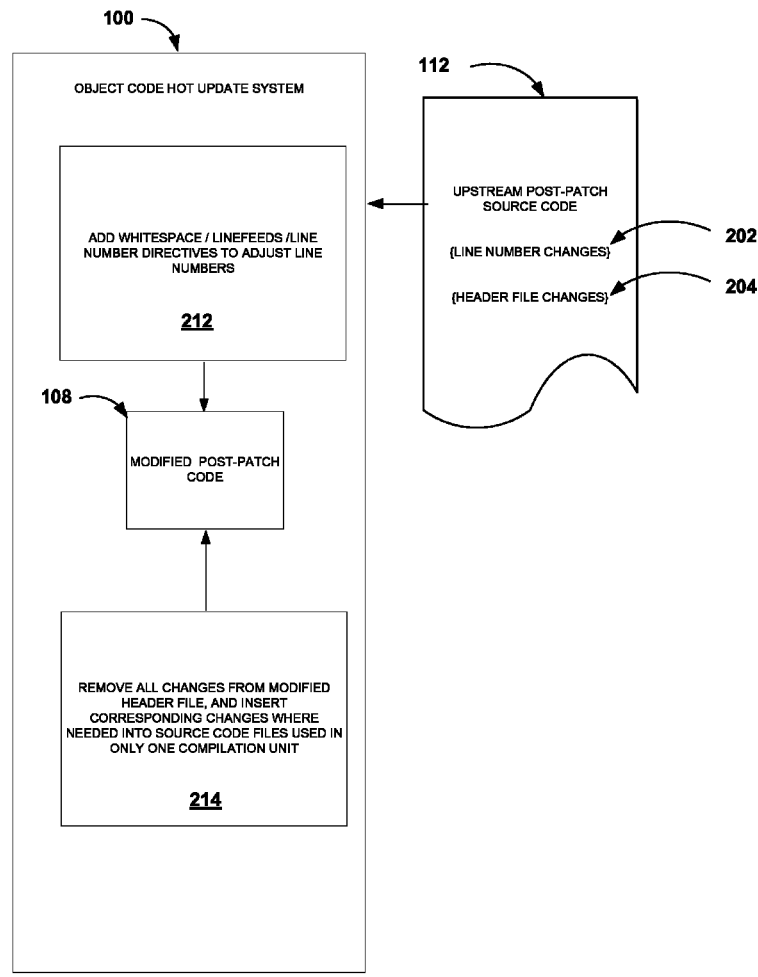
FIG. 8 is a diagram illustrating modifying the upstream post-patch code to provide modified post-patch code, including modifying the candidate extra-change site in accordance with an exemplary embodiment disclosed herein.

Now referring to FIG. 8, once the candidate extra-change site 202 or 204 has been identified, the upstream post-patch source code 112 is modified to eliminate the candidate extra-change site. In the example of FIG. 7, if the candidate extra-change site 202 is generated by line number changes, the upstream post-patch source code 112 can be modified, for example, by adding or removing linefeeds or line number directives to adjust line numbers so that the effect of the line number change will not generate a update to Function 1. Similarly, the effects of the candidate extra-change site 204 can be nullified, for example, by removing the change at site 204 entirely, and inserting corresponding changes as needed into source code files used in only one compilation unit, or not used in at least one of the compilation units in which the file including candidate extra-change site 204 is used. In some programming environments, it may suffice to alter the post-patch source code at site 204 so that it does not differ from pre-patch source code after a preprocessing phase, or so that it does not differ in the set of identifiers declared, or in other ways short of entirely eliminating the change, together with inserting corresponding changes as needed into other source code files.

A fifth challenge occurs when some patches require additional information from the analysis of the upstream patch in order to produce a working object code hot update. Further details are described below in conjunction with the fifth challenge example.

Figure 9:
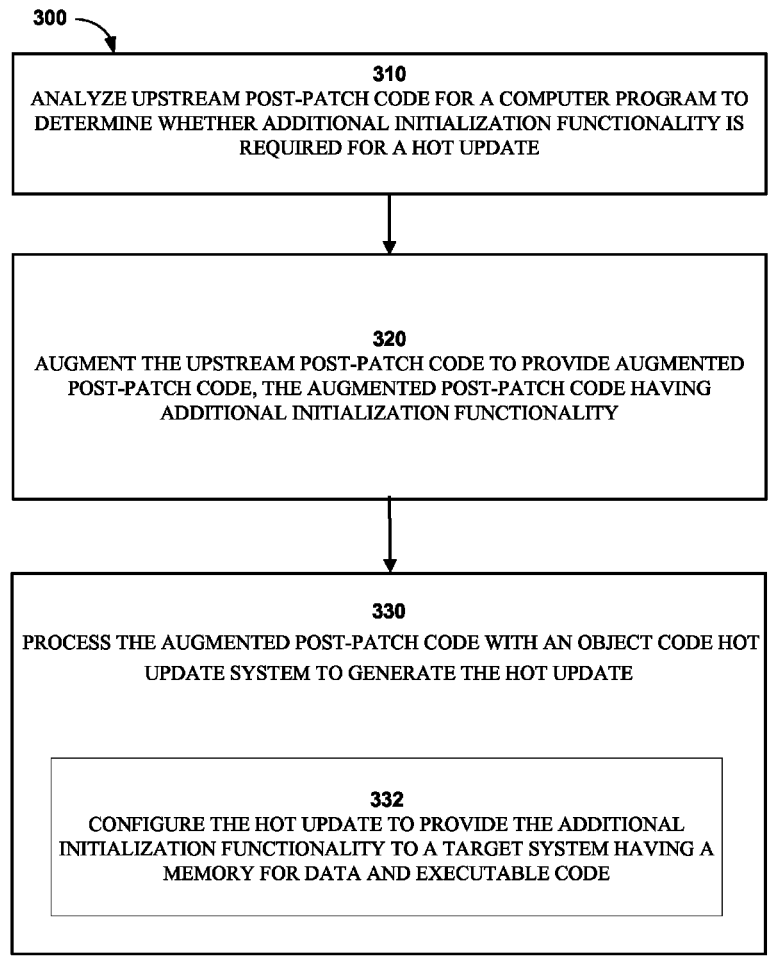

Flow chart 300 illustrated in FIG. 9 diagrams the overall process of generating a hot update 110 in one embodiment. In step 310, upstream post-patch code 115 for a computer program is analyzed to determine whether additional initialization functionality is required for a hot update. In step 320, the upstream post-patch code 115 is augmented to provide augmented post-patch code 108, the augmented post-patch code 108 having additional initialization functionality. In step 330, the augmented post-patch code 108 is processed with an object code hot update system 100 to generate the hot update 110, and in step 332, the hot update 110 is configured to provide the additional initialization functionality to a target system 120 having a memory 160 for data and executable code.

Figure 10:
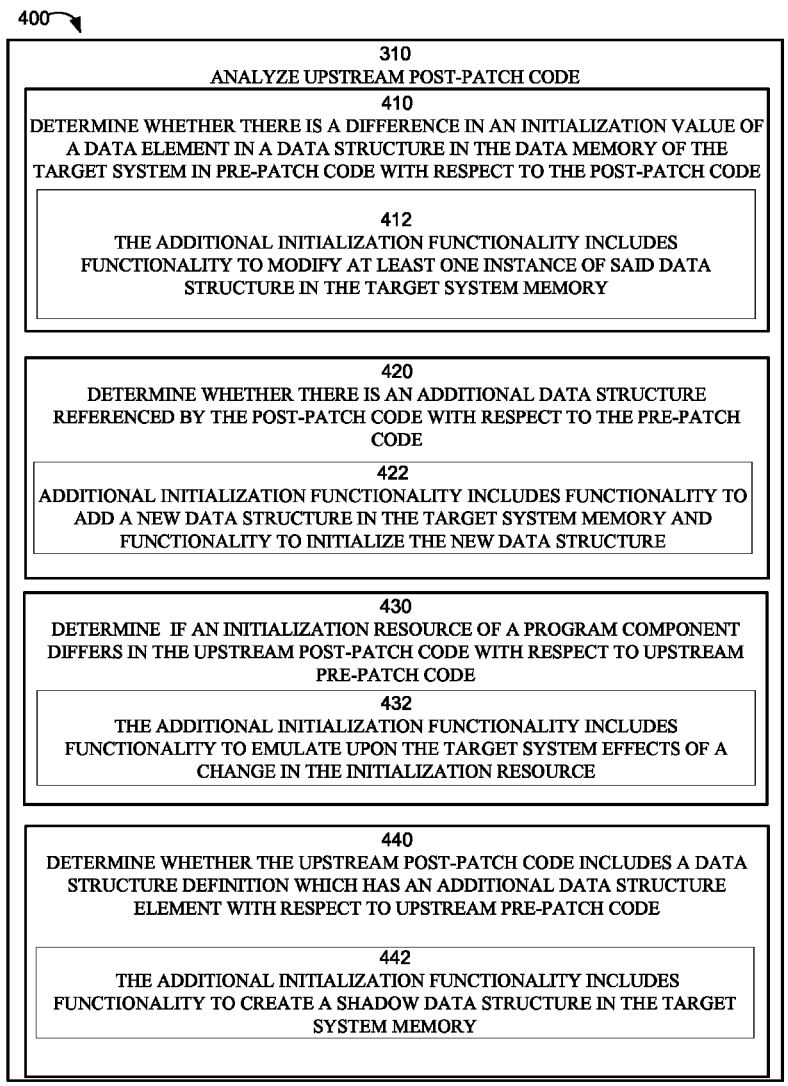

FIG. 10 is a flow chart 400 of processing steps showing additional details in conjunction with flow chart 300 of FIG. 9. In one embodiment, step 410 determines whether there is a difference in an initialization value of a data element in a data structure in the data memory 160 of the target system 120 in pre-patch code with respect to the post-patch code. In step 412, the additional initialization functionality includes functionality to modify at least one instance of the data structure in the target system memory 160. In step 420, it is determined whether there is an additional data structure referenced by the post-patch code with respect to the pre-patch code. If it is determined that there is an additional data structure referenced by the post-patch code with respect to the pre-patch code, additional initialization functionality is added which includes functionality to add a new data structure in the target system memory and functionality to initialize the new data structure in step 422.

In step 430, it is determined if an initialization resource of a program component differs in the upstream post-patch code 115 with respect to upstream pre-patch code. If it is determined that an initialization resource differs in the upstream post-patch code 115 with respect to upstream pre-patch code, then in step 432, additional initialization functionality is added which includes functionality to emulate upon the target system effects of a change in the initialization resource. In step 440, it is determined whether the upstream post-patch code 115 includes a data structure definition which has an additional data structure element with respect to upstream pre-patch code. If it is determined that the upstream post-patch code 115 includes a data structure definition which has an additional data structure element with respect to upstream pre-patch code, then the additional initialization functionality is added which includes functionality to create a shadow data structure in the target system memory in step 442.

FIG. 11 is a flow chart 450 of processing steps showing additional details in conjunction with flow chart 300 of FIG. 9. Configuring the hot update includes placing in a data structure in the hot update a pointer corresponding to a function providing initialization in step 460. Steps 470, 480 and 490 describe additional initialization functionality included in the hot update by augmenting the upstream post-patch code 115. In step 470, additional initialization functionality includes providing initialization functionality as if the computer program was rebuilt from upstream post-patch code 115 and restarted. In step 480, additional initialization functionality includes functionality to create a shadow data structure in the target system memory. In step 482, additional initialization functionality further includes functionality to initialize the shadow data structure.

Figure 12:
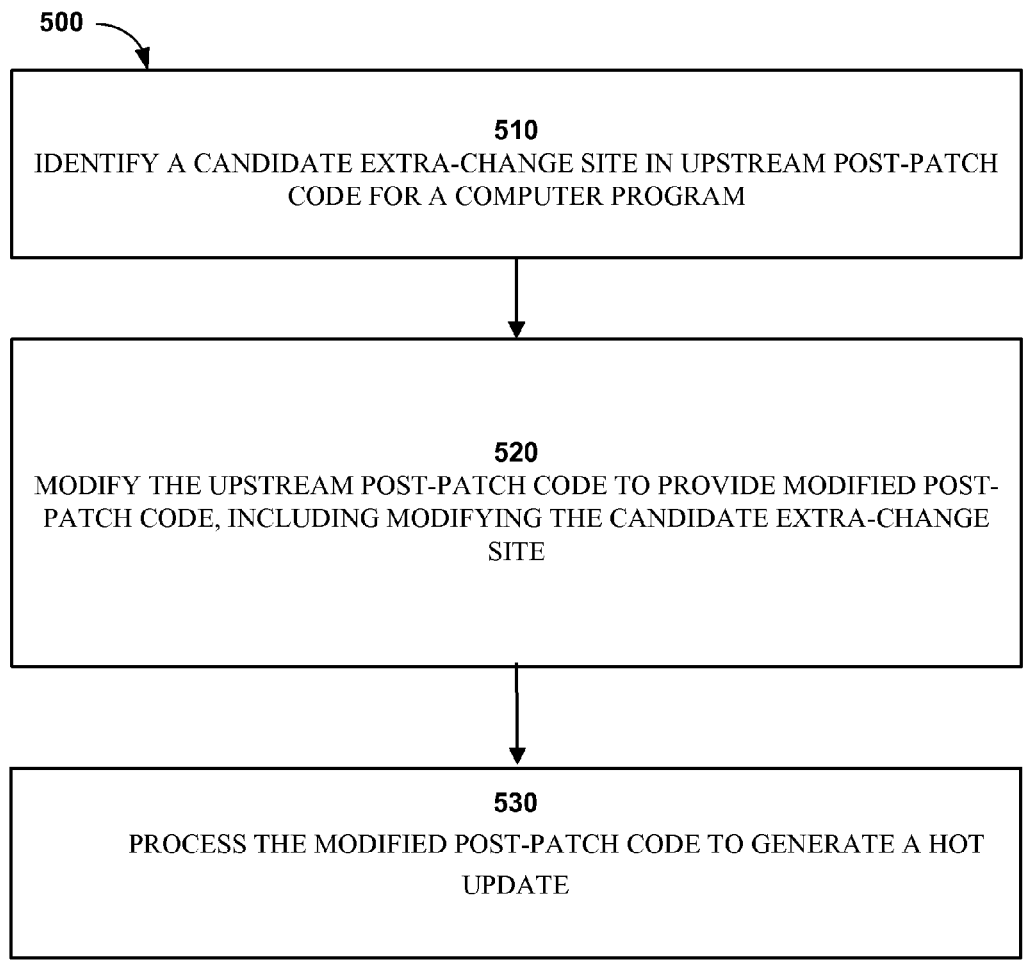

FIG. 12 is a flow chart 500 showing additional exemplary techniques related to extra-change sites. In step 510, a candidate extra-change site is identified in upstream post-patch code 115 for a computer program. In step 520, the upstream post-patch code 115 is modified to provide modified post-patch code, including modifying the candidate extra-change site and in step 530, the modified post-patch code is processed to generate a hot update.

Figure 13:
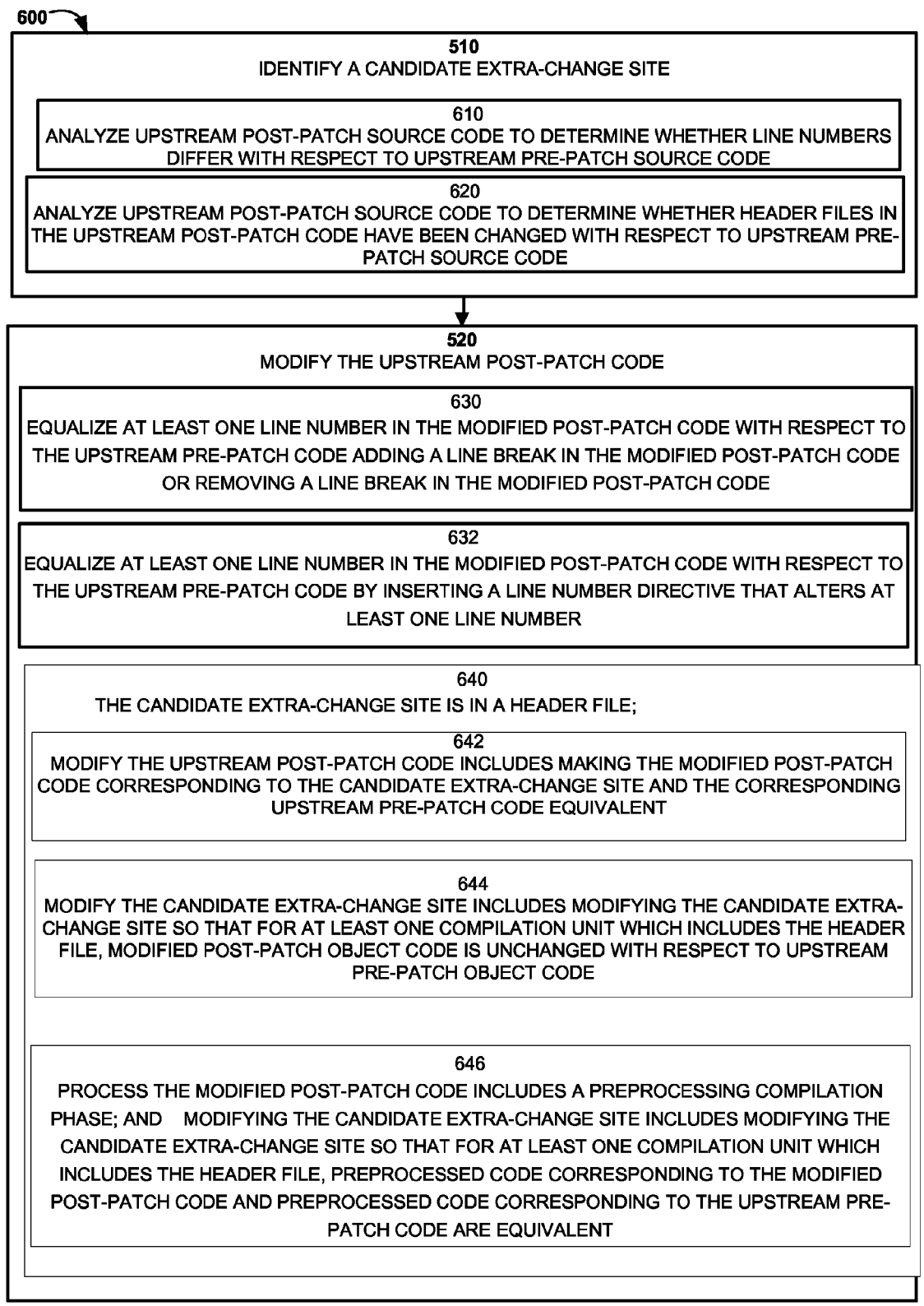

FIG. 13 is a flow chart 600 of processing steps showing additional details in conjunction with flow chart 500 FIG. 12. In order to identify a candidate extra-change sites, in one embodiment, step 610 analyzes upstream post-patch source code to determine whether line numbers differ with respect to upstream pre-patch source code. In step 620, upstream post-patch source code is analyzed to determine whether header files in the upstream post-patch code 115 have been changed with respect to upstream pre-patch source code.

Several techniques are used to modify the upstream post-patch code 115. In step 630, at least one line number is equalized in the modified post-patch code with respect to the upstream pre-patch code by adding a line break in the modified post-patch code or removing a line break in the modified post-patch code. A line number is equalized with respect to the upstream pre-patch code when the post-patch code is so modified that a line of the post-patch code has the same line number in the modified post-patch code as in the upstream pre-patch code, where the same line in the upstream post-patch code 115 had a different line number. In step 632, at least one line number is equalized in the modified post-patch code with respect to the upstream pre-patch code by inserting a line-number directive. A line-number directive is any fragment of code employing a feature of a programming environment to alter how source code line numbers are computed, processed, emitted in object code or other output, or otherwise treated by the programming environment. For example, in a programming environment providing the C programming language, a source code line of the form "#line" followed by a number will generally serve as a line-number directive that causes the immediately following source code line to be numbered with the specified number and subsequent source code lines to be numbered with successive numbers.

In step 640, the candidate extra-change site is identified in a header file and the following steps incorporate modifications to the code at the candidate extra-change site to avoid an object code extra-change site. In step 642, the upstream post-patch source code is modified to make the modified post-patch source code at the candidate extra-change site and the corresponding upstream pre-patch source code equivalent. The term "equivalent", as used herein to pre-patch and post-patch source code, means that either the pre-patch and post-patch source code are equal, or they differ only in whitespace, comments, or other differences that will not result in differences in object code. In step 644, the candidate extra-change site is modified to modify the candidate extra-change site so that for at least one compilation unit which includes the header file, the modified post-patch object code is unchanged with respect to the upstream pre-patch object code. In step 646, the modified post-patch code is processed in a preprocessing compilation phase; and the candidate extra-change site is modified including modifying the candidate extra-change site so that for at least one compilation unit which includes the header file, preprocessed code corresponding to the modified post-patch code and preprocessed code corresponding to the upstream pre-patch code are equivalent.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

EXAMPLES

The attached Appendix includes exemplary source code which demonstrates techniques described herein applied to certain exemplary updates. Each exemplary update is a security update developed for the Linux operating system kernel between 2005 and 2009. Each example includes three source code patches. A patch labeled "upstream" is a source code patch developed by the Linux operating system kernel development community to address a specific security problem; in the context of object code hot updates, each example upstream patch poses one of the challenges discussed herein. A patch labeled "full" is a version of the upstream patch modified according to an embodiment of the present invention in order to address the challenge. A patch labeled "changes" shown for clarity illustrates the difference between the upstream patch and the full patch. The patches comprised by the example update labeled "CVE-2006-1056" are arranged differently as described below. Each example update is discussed in detail below.

In addition to the patches comprised by the example updates, the source code files "ksplice-patch.h" and "ksplice-shadow.h" are also attached. These source code files provide certain definitions that are used in the example updates in order to address the challenges here discussed. Specifically, the source code macros ksplice_pre_apply, ksplice_check_apply, ksplice_apply, ksplice_post_apply, and ksplice_fail_apply serve to indicate that a function should be executed when the update is applied, and the source code macros ksplice_pre_reverse_, ksplice_check_reverse, ksplice_reverse, ksplice_post_reverse, and ksplice_fail_reverse serve to indicate that a function should be executed when the update is undone. Each of these macros operates by depositing a pointer to the indicated function in a designated section of the object file, which the object code hot update system may then examine in order to arrange for the object code hot update to execute the indicated function. As set forth above, alternative ways of providing the necessary information to the object code hot update system are also possible and are included within the scope of the present invention; the source code files ksplice-patch.h and ksplice-shadow.h are provided by way of example and in order to aid in the understanding of the example update source code. Other definitions in these two source code files are discussed below.

First Challenge

In certain embodiments, the challenge related to initialization resources described above can be substantially overcome by emulating the effects of a change to the initialization resources of a program component. In other words, the full patch can initialize a data structure to the same state as if the new version of the program had been run instead of the old version. For example, the resulting state may be the same state as if the patch was applied in the conventional way by building a new binary copy of the computer program, loading the new binary program and restarting the program. For example, a change may affect the code included in the program component that fills in a data structure during initialization. Typically, such a change is best emulated by modifying the data structure when the update is applied so as to replace values inside the data structure with the values that would have been filled in by the new version of said code. This method is demonstrated in the examples labeled "CVE-2006-1056" and "CVE-2007-4571", attached. The example update "CVE-2006-1056" includes an upstream patch, like the other examples, and two patches "part 1" and "part 2" that together compose the "full" patch. In update CVE-2006-1056, lines 9-10 and 48-51 on page U-1 in the upstream patch affect the code that fills in a cpuinfo_x86 data structure. Lines 18-28 of page U-4 in the full patch provide code to be executed when the object code hot update is applied that modifies each such data structure so as to replace the X86_FEATURE_FXSAVE_LEAK bit of the x86_capability field with the value that would have been filled in by the new version of the code.

In update CVE-2007-4571, lines 141-148 on page U-11 in the upstream patch affect the code that fills in the proc_fops element in the snd_mem_proc data structure. Lines 189-194 on page U-15 in the full patch provide code to be executed when the object code hot update is applied that replaces the value of the proc_fops element in the snd_mem_proc data structure with the value that would have been filled in by the new version of the code, and saves the old value as ksplice_old_snd_mem_proc_fops. Lines 204-208 provide code to be executed when the object code hot update is reversed that restores the value saved as ksplice_old_snd_mem_proc_fops.

Occasionally, particularly if the affected data structure or the affected data structure elements are relied upon in only a small number of places in the program, it may be preferable to change the code that relies on the affected data structure or the affected data structure elements so as to behave in the same manner as if the data structure had been filled in by the new version of the initialization code. This method is demonstrated in the example labeled "CVE-2007-3851". Lines 9-10 on page U-18 in the upstream patch affect the code that fills in the dev_priv data structure, specifically affecting the use_mi_batchbuffer_start element. This data structure element is relied upon in only one line of the source code. In the full patch, lines 24-25 on page U-19 change this line so as to behave in the same manner as if the dev_priv data structure had been filled in by the new version of the initialization code.

In other cases, a change may affect data associated with the program component that is interpreted by the module loader, meaning the program code responsible for incorporating program components into the running program, during the initialization of the program component. This type of change may typically be emulated by modifying data structures set up or altered by the module loader so as to replace values inside the data structure with the values that would have been filled in by the module loader given the new version of the data associated with the program component. This method is demonstrated in the example labeled "CVE-2005-3179". Lines 9-10 on page U-21 in the upstream patch affect data associated with a program component, the "drm" Linux kernel module, specifically the permissions associated with the "debug" parameter of the module. Lines 12-50 on page U-22 and lines 84-100 on page U-23 of the full patch provide code to be executed when the update is applied that locate the "struct attribute" element within the "param_attrs→grp.attrs" data structure associated with the module, save the location of this element as ksplice_debug_attr, and use the sysfs_chmod_file function to modify data structures set up by the module loader so as to replace the permission value with the value that would have been filled in by the module loader given the new version of the permissions data on lines 9-10 on page U-21.

Second Challenge

The second challenge is addressed by supplying code to be run when the update is applied that emulates the effects of a change to code that performs initialization tasks for data structures. By way of example and not limitation, if the change affects the values that the data structure initialization code puts into a data structure, then the effects of that change may be emulated when the update is applied by updating data structures in memory to include the values that would have been filled in by the new version of the data structure initialization code. This method is demonstrated in the examples labeled "CVE-2006-2071" and "CVE-2008-0007". In the example CVE-2006-2071, lines 9-10 on page U-26 in the upstream patch affects the function shm_mmap, which is data structure initialization code that initializes certain data structures of type "struct vm_area_struct". Specifically, it affects the value that the data structure initialization code puts into the vm_flags element, by clearing the VM_MAYWRITE flag when the VM_WRITE flag is not set. Lines 17-47 of the full patch on page U-27 supply code to be executed when the object code hot update is applied that updates data structures in memory that were initialized by shm_mmap, clearing the VM_MAYWRITE flag on such data structures when the VM_WRITE flag is not set so as to make the data structures include the values that would have been filled in by the new version of shm_mmap. In the example CVE-2008-0007, lines 9, 17, 29-30, 57, 70, 115, and 128 of the upstream patch on pages U-29 to U-31 modify several pieces of data structure initialization code that initialize certain data structures of type "struct vm_area_struct". Specifically, it sets the VM_DONTEXPAND flag for these data structures. Lines 24-36, 57-66, 100-109, 130-165, 213-222, and 240-249 of the full patch on pages U-32 to U-36 supply code to be executed when the object code hot update is applied that locates each affected data structure and sets the VM_DONTEXPAND flag so as to make the data structures include the values that would have been filled in by the new versions of the affected data structure initialization code.

By way of example and not limitation, some changes may add new elements to the definition of a data structure type, so that data structure initialization code must allocate memory for these elements and fill the elements with values. In general it may not be possible when the update is applied to expand affected data structures in place, because the adjacent memory may have been allocated for other purposes, and it may not be possible or may not be practical to move affected data structures to new locations in memory, because their addresses may be stored in diverse other data structures in the running program. Consequently a preferred method of emulating a change that adds new elements to the definition of a data structure type is to create new "shadow" data structures associated with affected data structures and located elsewhere in memory. The shadow data structures may be created for each affected data structure when the update is applied, or at a later time when required. The code which reads and writes the new elements must be changed to find them in the shadow data structure rather than in the original data structure. Because only the code already modified or added by the traditional update may refer to the new updates, the extent of changes required in order to refer to shadow data structures is bounded by the original extent of the changes in the traditional update. This method is demonstrated in the example labeled "CVE-2005-2709". Lines 31 and 51-52 in the upstream patch on page U-40 add a new element "set" to the definition of the "struct proc_dir_entry" data structure type and new elements "used" and "unregistering" to the definition of the "struct ctl_table_header" data structure type. Lines 42-59 of the full patch on page U-45 use the facilities provided in ksplice-patch.h and ksplice-shadow.h to provide code to set up shadow data structures for the new fields, specifically using the macro DEFINE_SHADOW_FIELD to define a set of functions to create, access, and discard shadow data structures for each of the affected types. The example source code in ksplice-shadow.h provides a possible implementation of the functions relating to shadow data structures, specifically by setting up a global linked list "shadow_list" in which all shadow data structures are placed and distinguishing each shadow data structure by a pointer labeled "obj" to the corresponding object and a pointer labeled "key" to a word allocated for each type of shadow data structure. Other possible implementations of shadow data structures will be obvious to one skilled in the art and are included within the scope of the present invention.

The lines elsewhere in the upstream patch that referred to the new fields refer instead in the full patch to shadow data structures by using the functions so defined. For example, lines 64-69 of the changes patch on page U-52 modify the function use table, which was added in the upstream patch, so that rather than referring to the new "used" and "unregistering" elements of the data structure "p", the modified code uses the "make_header_shadow" function defined on lines 42-59 of the full patch as described above in order to locate the shadow data structure corresponding to "p" or create it if it does not already exist, and then it refers to the "used" and "unregistering" elements found in the shadow data structure. The changes on lines 76-138 and 167-209 of the changes patch make similar modifications to the remaining pieces of code that referred in the upstream patch to the new data structure elements.

Third Challenge

The third challenge occurs when a traditional update adds or changes code that relies on additional data structures which the pre-patch code does not create. This challenge is addressed by supplying code to be run when the update is applied to perform initialization tasks for new data structures to be used by the updated code. For example, the additional code may allocate memory for the new data structures, initialize them, and insert references to them into other data structures in the target system memory.

Fourth Challenge

A fourth challenge is the situation where it may be unsafe to modify or replace a function that is in the process of being executed by any program thread. Consequently it may be difficult to apply an update that modifies many functions or heavily-used functions, and it is desirable to avoid including unnecessary functions in the object code hot update. A type of problem with an object code hot update system is unnecessary identification of functions to be updated and subsequent difficulty in applying updates that include these functions. One cause of unnecessarily updated functions is language features that include a source code line number in the binary code, or otherwise cause aspects of the binary code to depend on line numbers, which may for example be used for debugging. If an otherwise unmodified function is located in a file after a change that adds or removes lines, unnecessary changes may result.

Another cause of unnecessarily updated functions is choices that a compiler makes non-deterministically or that it makes in one function based in part on information in other parts of the compilation unit. As a result, the post-patch object code for a function may differ from the pre-patch object code for the function, even if the function has the same pre-patch source code and post-patch source code and even if the semantic meaning of the source code of the function is the same in the post-patch source code as in the pre-patch source code. The post-patch object code for the function may have the same semantic meaning as the pre-patch object code for the function, or the compiler may rely on its knowledge of other parts of the program to allow the semantic meaning of the object code to differ.

In some programming environments, these object code differences may occur only when the pre-patch and post-patch source code differ after a preprocessing stage, so that, for example, changes to a macro may produce no object code difference if the macro is not used.

In one embodiment, an extra step is added to the use of the object code hot update system. Instead of applying the object code hot update system to the actual program source code and the actual program source code as modified by the traditional source code patch, a transformation is applied to either or both source codes. Equivalently, rather than apply a transformation to the program source code as modified by the traditional source code patch, the source code patch itself may be transformed before modifying the program source code. These transformations may be done by any combination of manual effort, computer programs, or other means.

In another embodiment, the post-patch source code is modified to eliminate changes to the line numbers of some or all functions in the program. For example, line breaks may be added or removed, or a line-number directive may be inserted. In yet another embodiment, if the upstream source code patch modifies one or more files that are included in multiple compilation units (e.g., "header files"), the patch is modified so that some of these compilation units have no changes. One way to accomplish this is to remove all changes from a header file, and insert corresponding changes where needed into source code files used in only one compilation unit. Other substantially similar techniques may be implemented.

The latter two embodiments are illustrated in the example update labeled CVE-2008-4210, which includes an upstream patch, a full patch, and two separate changes patches shown for clarity. Lines 23-24 of the upstream patch on page U-55 modify the header file named include/linux/fs.h. Lines 37-38 of the changes patch labeled "modification to remove changes from header file" on page U-59 reverse the modification to include/linux/fs.h and lines 9-11 and 23-25 insert corresponding changes into the source code files fs/open.c and fs/splice.c, so that the full patch does not modify any header files. Lines 9-11, 41, and others of the upstream patch on pages U-55 to U-56 add and remove lines to the source files fs/open.c and mm/filemap.c, so that the line numbers in subsequent functions in these source files are modified. Lines 9, 12, 22, 29, and 32 of the changes patch labeled "modification to eliminate changes in line numbers" on page U-60 remove blank lines, including line breaks, from the source file fs/open.c so that the full patch does not modify the line numbers in any unmodified function in fs/open.c, and other lines of the changes patch serve a similar purpose for other source code files.

Fifth Challenge

A fifth challenge occurs when some patches require additional information from the analysis of the upstream patch in order to produce a working object code hot update. As one example, the analysis indicates that a certain data structure in the program never changes at runtime and can be safely replaced with a modified version from the post-patch object code. As a second example, a programmer may need to indicate that a certain function may be safely updated in place rather than by the insertion of "trampoline" jump instructions or other means, or to indicate that certain criteria for safety are met and leave the system to confirm any remaining criteria. As a third example, the patch may change the meaning of existing data structures in the program, so that these data structures in the running program must be updated, and a programmer must specify how to do so in the form of additional source code or by other means.

In these and other examples, the information to be provided may refer to functions, data structures, or other elements of the running program. In commonly used programming languages, such elements may be local to a compilation unit, module, or other program component in which they are used, so that the same name may refer to different elements in different components of the program. Consequently, if additional source code or other information refers to such an element, the meaning may be ambiguous.

In another embodiment, a programmer or an automated system provides additional information to produce the object code hot update in the form of source code added to the source code patch. This permits functions, data structures, and other elements of the running program to be referred to in the same manner as in the upstream source code of the program. For example, the additional source code may describe actions to be performed when the object code hot update is applied or undone, or may indicate an assumption that the system can safely make about a data structure, function, or other element in the program.

While configurations of the system and method have been particularly shown and described with references to configurations thereof, it will be understood by those skilled in the art that various changes in form and details may be made therein without departing from the scope of the invention. For example, the order of processing steps in the flow charts is not limited to the order shown herein, and a claim listing steps does not imply any order of the steps. Accordingly, the present invention is not limited by the examples provided above.

What is claimed is:

1. In a computing environment, a method comprising:
analyzing upstream pre-patch code for a computer program to identify a definition for a data structure comprising a plurality of data elements;
analyzing upstream post-patch code for the computer program to determine whether additional initialization functionality is required for a hot update, wherein analyzing upstream post-patch code comprises determining whether the upstream post-patch code includes a data structure definition comprising the plurality of data elements and an additional data element not included in the upstream pre-patch code;

augmenting the upstream post-patch code to provide augmented post-patch code, the augmented post-patch code having additional initialization functionality;

processing the augmented post-patch code with an object code hot update system to generate the hot update; and configuring the hot update to provide the additional initialization functionality to a target system having a memory for data and executable code and comprising the data structure with the plurality of data elements, wherein the additional initialization functionality includes functionality to create, in the memory of the target system, a shadow data structure comprising the additional data element and a pointer to the data structure comprising the plurality of data elements.

2. The method of claim 1, wherein the additional initialization functionality further includes providing initialization functionality as if the computer program was rebuilt from upstream post-patch code and restarted.

3. The method of claim 1, wherein analyzing upstream post-patch code further comprises determining whether there is a difference in an initialization value of a data element in the data structure in the data memory of the target system in pre-patch code with respect to the post-patch code.

4. The method of claim 3, wherein the additional initialization functionality further includes functionality to modify at least one instance of said data structure in the target system memory.

5. The method of claim 1, wherein analyzing upstream post-patch code further comprises determining whether there is an additional data structure referenced by the post-patch code with respect to pre-patch code.

6. The method of claim 5, wherein the additional initialization functionality further includes functionality to add a new data structure in the target system memory and functionality to initialize the new data structure.

7. The method of claim 1, wherein analyzing upstream post-patch code further comprises determining if an initialization resource of a program component differs in the upstream post-patch code with respect to upstream pre-patch code.

8. The method of claim 7, wherein the additional initialization functionality further includes functionality to emulate upon the target system effects of a change in the initialization resource.

9. In a computing environment, a method comprising:
identifying a first candidate extra-change site in upstream post-patch code for a computer program,
wherein the first candidate extra-change site corresponds to a difference in line numbers between the upstream post-patch code and upstream pre-patch code for the computer program, and
wherein the difference in line numbers creates a requirement for an update to a program function executing on a target system;
modifying the upstream post-patch code to provide modified post-patch code, including modifying the first candidate extra-change site,
wherein modifying the first candidate extra-change site comprises adjusting line numbers in the upstream post-patch code to eliminate the requirement for the update; and processing the modified post-patch code to generate a hot update, for installation on the target system, lacking the update to the program function.

10. The method of claim 9, wherein adjusting line numbers comprises at least one selected from a group consisting of:
adding a line break in the modified post-patch code; and
removing a line break in the modified post-patch code.

11. The method of claim 9, wherein modifying the upstream post-patch code comprises equalizing at least one line number in the modified post-patch code with respect to upstream pre-patch code by inserting a line-number directive.

12. The method of claim 9, further comprising:
identifying a second candidate extra-change site in the upstream post-patch code for the computer program, wherein:
the second candidate extra-change site is in a header file; and
modifying the upstream post-patch code includes making the modified post-patch code corresponding to the second candidate extra-change site and the corresponding upstream pre-patch code equivalent.

13. The method of claim 9, further comprising:
identifying a second candidate extra-change site in the upstream post-patch code for the computer program, wherein:
the second candidate extra-change site is in a header file; and
modifying the upstream post-patch code includes modifying the second candidate extra-change site so that for at least one compilation unit which includes the header file, modified post-patch object code is unchanged with respect to upstream pre-patch object code.

14. The method of claim 9, further comprising:
identifying a second candidate extra-change site in the upstream post-patch code for the computer program, wherein:
the second candidate extra-change site is in a header file;
processing the modified post-patch code includes a pre-processing compilation phase; and
modifying the upstream post-patch code includes modifying the second candidate extra-change site so that for at least one compilation unit which includes the header file, preprocessed code corresponding to the modified post-patch code and preprocessed code corresponding to upstream pre-patch code are equivalent.

15. The method of claim 9, wherein identifying first candidate extra-change site comprises analyzing the upstream post-patch source code to determine whether line numbers differ with respect to upstream pre-patch source code.

16. The method of claim 14, wherein identifying the second candidate extra-change site comprises analyzing the upstream post-patch source code to determine whether header files in the upstream post-patch code have been changed with respect to upstream pre-patch source code.

17. A computer system comprising:
a processor;
a memory coupled to the processor, the memory storing instructions that when executed by the processor cause the computer system to perform the operations of:
analyzing upstream pre-patch code for a computer program to identify a definition for a data structure comprising a plurality of data elements;
analyzing upstream post-patch code for the computer program to determine whether additional initialization functionality is required for a hot update, wherein analyzing upstream post-patch code comprises determining the upstream post-patch code includes a data structure definition comprising the plurality of data elements and an additional data element not included in the upstream pre-patch code;

augmenting the upstream post-patch code to provide augmented post-patch code, the augmented post-patch code having additional initialization functionality;

processing the augmented post-patch code with an object code hot update system to generate the hot update; and configuring the hot update to provide the additional initialization functionality to a target system having a memory for data and executable code and comprising the data structure with the plurality of data elements, wherein the additional initialization functionality includes functionality to create a shadow data structure, in the memory of the target system, comprising the additional data element and a pointer to the data structure comprising the plurality of data elements.

18. A computer readable storage medium having computer readable program code embodied therewith, the computer readable program code comprising functionality to:

analyze upstream pre-patch code for a computer program to identify a definition for a data structure comprising a plurality of data elements;

analyze upstream post-patch code for the computer program to determine whether additional initialization functionality is required for a hot update, wherein analyzing upstream post-patch code comprises determining the upstream post-patch code includes a data structure definition comprising the plurality of data elements and an additional data element not included in the upstream pre-patch code;

augment the upstream post-patch code to provide augmented post-patch code, the augmented post-patch code having additional initialization functionality;

process the augmented post-patch code with an object code hot update system to generate the hot update; and configure the hot update to provide the additional initialization functionality to a target system having a memory for data and executable code and comprising the data structure with the plurality of data elements, wherein the additional initialization functionality includes functionality to create a shadow data structure, in the memory of the target system, comprising the additional data element and a pointer to the data structure comprising the plurality of data elements.

* * * * *

UNITED STATES PATENT AND TRADEMARK OFFICE
CERTIFICATE OF CORRECTION

PATENT NO. : 8,607,208 B1
APPLICATION NO. : 12/940393
DATED : December 10, 2013
INVENTOR(S) : Arnold et al.

Page 1 of 1

It is certified that error appears in the above-identified patent and that said Letters Patent is hereby corrected as shown below:

On Title page, column 2, under Other Publications, line 2, delete "ptgmedial." and insert
-- ptgmedia. --, therefor.

In the Specification

In column 4, line 16, delete "that that" and insert -- that --, therefor.

Signed and Sealed this
Fifteenth Day of July, 2014

Michelle K. Lee
*Deputy Director of the United States Patent and Trademark Office*